Patented Jan. 16, 1951

2,538,713

UNITED STATES PATENT OFFICE 2,538,713

PURIFICATION OF PENICILLIN SOLUTIONS

Robert F. Taylor, Terre Haute, Ind., assignor to Commercial Solvents Corporation, Terre Haute, Ind., a corporation of Maryland No Drawing. Application January 11, 1945, Serial No. 572,435

2 Claims. (Cl. 260—302)

This invention relates to the purification of penicillin material resulting from the propagation of molds of the type of *Penicillium notatum* on nutrient media. It relates more particularly to a method for removing therefrom troublesome impurities which are not removed in any of the usual purification steps commonly practiced and which otherwise carry over into the finally dried penicillin material.

It has recently been discovered that when molds of the type of *Penicillium notatum* are propagated on certain nutrient media, they produce a material called penicillin which has valuable antibacterial properties, particularly useful in combating infections.

The penicillin material as produced in the fermentation liquor is in an extremely impure and dilute state and its characteristics of instability and the like require a series of carefully controlled purification and concentration steps to bring the material into a purified and concentrated state suitable for storage and subsequent therapeutic administration.

At certain stages in one purification process, the crude penicillin material as formed is adsorbed after clarification upon active carbon material and eluted therefrom with an aqueous solution of a water-miscible solvent such as a ketone, an aliphatic alcohol, and the like. Later steps may include the evaporation of the organic solvent portion of this aqueous organic solution eluate and the subsequent further purification of the evaporated eluate by extraction with a water-immiscible organic solvent such as amyl acetate and by reextraction from the organic solvent by aqueous alkaline solutions followed by drying. In carrying out the purification process according to these methods, certain impurities fail of complete removal even during the multiple steps involved. Although these impurities appear to do no harm from a therapeutic standpoint they undesirably reduce the purity and stability of the final penicillin concentrate.

It is therefore an object of my invention to provide a process for purifying penicillin material which removes impurities not otherwise removed by previously practiced purification steps.

Another object of the invention is to further purify organic solvent solutions of impure penicillin material obtained at any stage in the progressive concentration and purification of penicillin material, such organic solvent solutions being either water-miscible or water-immiscible and either substantially water-free or containing substantial quantities of water.

Other objects will be apparent from the specification and claims.

According to my invention a substantial purification is effected at any stage in the recovery of the penicillin material in which the penicillin is present in organic solvent solution, for example in solutions by means of which the penicillin has been eluted from an active carbon adsorbate, or by means of which it has been extracted from an impure water solution of penicillin material or the like. In the case of eluate solutions some impurities can be prevented from carrying over to the eluate solution by washing the active carbon adsorbate with water prior to elution. But even with the use of this washing expedient, certain unidentified impurities are eluted from the adsorbate along with the penicillin material and appear especially resistant to removal by any step which will remove these impurities without at the same time removing or destroying the penicillin itself. Many of these same impurities therefore are carried on through the subsequent extraction steps described above.

In pursuance of my invention I remove these impurities to a substantial degree by treating the penicillin-containing organic solvent solution at any stage with fresh active carbon as will be more fully described hereinafter.

The nature of the impurities removed is unknown, but they are believed to have certain characteristics of acidity, solubility and the like so similar to those of penicillin that they escape separation by the usual purification methods.

My invention applies to any impure solution of penicillin material in an organic solvent, either in aqueous or substantially water-immiscible organic solvent solution containing impurities of the class described which escape removal by the standard purification steps described.

Organic solvents of the class described whose penicillin solutions may be purified according to my invention include ketones such as acetone, methyl ethyl ketone, methyl isobutyl ketone, alcohols such as butanol, isopropyl alcohol, isobutyl alcohol, amyl alcohol, etc., esters such as butyl acetate, isopropyl acetate, amyl acetate, ethers such as diethyl ether, chloroform and the like. My process is especially valuable in connection with the recovery processes above referred to and will be described in connection with such processes.

In recovering penicillin material according to these presently practiced processes above referred to, the fermentation liquor containing the penicillin is clarified as by filtration, centrifugation, or the like, and is then treated with active carbon, which adsorbs the penicillin material and a portion of the impurities present. The active carbon is then separated from the liquor and is either directly eluted with an aqueous mixture of a partially or completely water-miscible organic solvent, or may be first washed with water to remove certain impurities without removing the adsorbed penicillin, and then eluted. This eluate solution contains not only the penicillin material from the original fermentation liquor, but also contains unidentified impurities which have been adsorbed on the carbon, and eluted therefrom along with the penicillin. According to the usual practice, the water-miscible organic solvent used to elute the penicillin material from the active carbon may be a ketone such as acetone, methyl ethyl ketone, etc., or a lower aliphatic alcohol such as isopropyl alcohol, butanol, isobutyl alcohol, or the like, and it is usually used in water solutions or mixtures in concentrations above 50% of solvent. When the purification steps according to my process are carried out on the organic solvent solutions at this stage of the recovery operations, maximum purification is obtained from eluates having relatively low solvent concentrations but above the concentration mentioned above. If the concentration used is appreciably below about 50–60%, appreciable loss of penicillin begins to occur by adsorption on the added carbon. At concentrations below about 60% solvent, the rate of filtration of the eluate solution from the added carbon appears to become slower, so that I prefer to carry out my purification steps on an eluate having a concentration above about 60% for example, between about 65 and 85% solvent to obtain maximum speed of operation and maximum recovery of penicillin.

In accordance with my invention, I treat the organic solvent solution containing the impure penicillin material, with fresh active carbon of the decolorizing type, either of the same grade or a different grade than that used for the original adsorption. Surprisingly, the active carbon material does not appear to adsorb the penicillin from this aqueous-organic solvent solution to any substantial degree although the same carbon may be useful to adsorb penicillin from the aqueous nutrient broth. But the carbon does adsorb certain unidentified materials which appear to have certain solubility characteristics and the like similar to penicillin, and which otherwise are carried on throughout the process to contribute to a final low purity product.

The impure organic solvent solution of penicillin may be treated with active carbon in any desired manner such as slurrying the char in the eluate and filtering. Another simple and convenient manner and one which is especially satisfactory in the case of eluate solutions is to prepare a filter mat or bed and simply to pass the eluate material through this carbon cake. The cake may be as thick as desired and this will depend somewhat on the concentration of the eluate solution. In general a filter cake of about an inch in thickness is sufficient and lesser thicknesses may be used in some cases. The relative area of the filter mat will be determined by the size of the batch to be purified.

In the case of water-immiscible organic solvent solutions, for example of the type obtained later on in the process when the evaporated eluate is extracted by a water-immiscible solvent such as amyl acetate or the like, the purification is most conveniently made by slurrying the active carbon with the solvent, and removing the carbon by, for example filtration, centrifugation, decantation or the like.

The type of active carbons which can be used to purify the penicillin-containing eluate according to my process belong to the class of so-called decolorizing carbons as distinct from the type known as gas adsorbing carbons. The source of the carbon appears to be immaterial so long as the carbons are neutral and not too fine to filter readily and as long as their decolorizing activity is high. This applies at least as to the types now commercially available. These types include those active carbons prepared from lignite of which the "Darcos" are representative, and of these, "Darco G–60" is particularly suitable. Also suitable are carbons prepared from waste products incidental to cellulose manufacture such as the "Nuchar" type, and also those prepared from treated wood such as appear on the market under the trade name of "Norit."

The quantity of active carbon used will vary with the size of the batch to be purified, and in the case of the aqueous eluates with the concentration of the aqueous solution of water-miscible organic solvent. It will also vary to some extent with the degree of purification desired. In general the degree of purification increases with increased amounts of active carbon up to the practicable limits of handling and economics, that is, up to about 100 grams of active carbon per liter of organic solvent solution, although it is usually not desirable to use the maximum quantities of carbon, as the use of greater quantities usually entails greater losses of penicillin activity. While the proportionate amounts of active carbon to be used in terms of volume of solution treated are substantially the same at any stage of the purification process, the actual amounts required in terms of active penicillin material recovered are less when the purification is practiced at the later stages of recovery in which the solids concentrations of the solutions treated are considerably higher.

The optimum purification consonant with high penicillin recovery appears to be effected in the case of the aqueous organic solvent eluate solutions when the apparent pH of the eluate solution is adjusted to about the lowest apparent pH which will result in a pH of approximately 6, plus or minus a few tenths of a pH, in the purified eluate solution, this pH usually being in the neighborhood of about 6.7 to 8.0. In the case of water-immiscible solvent solutions of penicillin, lower pH values may be used without the destruction of penicillin which tends to occur in the organic solvent solutions containing larger quantities of water, and the use of pH values in the neighborhood of 2 to 3 result in somewhat more rapid and effective purification, although the purification may be carried out satisfactorily at higher pH values up to about the neutral point if desired.

The pH or apparent pH values indicated for the organic solvent solutions throughout, are such values as are obtained by potentiometric methods using a glass electrode, and may or may not be the same value as would be obtained in a corresponding aqueous solution.

According to prior art practice, the eluate is not purified but is treated immediately after the adsorbing carbon is removed, to evaporate the organic solvent portion of the liquid, leaving the penicillin material in water solution. This water solution is then treated with a water-immiscible organic solvent such as amyl acetate to effect a purification and concentration of the penicillin material, and the organic solvent extract is next reextracted with an aqueous alkaline solution to effect further purification and concentration. This latter water solution of penicillin salt is then dessicated to its final state for storage and therapeutic administration. When prepared according to this procedure, the purities of the penicillin material, in terms of Oxford units of penicillin activity per milligram are considerably lower than desired. By the use of my process, purities can be raised by amounts ranging up to 100%, or more.

Since it is relatively difficult to measure and assay the activity concentration of the eluate in terms of purity of dry product because of the extremely low solids concentration at this stage, I find it convenient to measure the purity increase of the treated eluate after it has passed through several additional concentration steps, for example after evaporation of the water-miscible organic solvent portion of the eluate and the subsequent extraction of this evaporate with a water-immiscible organic solvent such as amyl acetate in comparison with solutions treated similarly except for the omission of the active carbon purification of the eluate solution. Thus in the examples and tables given below to illustrate the practicing of my invention, both with respect to the purification of an organic solvent solution of penicillin at the eluate stage and at the water-immiscible solvent extract stage, the purity increase of this amyl acetate extract is given, except in the case of the last example where the penicillin has been taken a step further to the final aqueous solution.

The following examples will serve to illustrate my invention.

EXAMPLE I

A filter mat one inch thick of active carbon was prepared on a Buchner funnel using 60 grams of active carbon of the lignite type (Darco G-60). One liter of aqueous acetone eluate solution assaying 109 Oxford units of penicillin activity per ml. having an acetone concentration of 70% and adjusted to a pH of 7.35 was filtered through the active carbon filter mat, and washed with 180 ml. of a 70% aqueous acetone solution. The filtered eluate was adjusted to pH of 8.5 and evaporated in vacuo below 25° C. until substantially all the acetone had been evaporated. The evaporated eluate showed a penicillin recovery of 100% and had an assay of 390 units per ml. The evaporate was then chilled to 10° C., acidified to pH 2.5 and extracted for five minutes with 40 ml. of amyl acetate, the penicillin under these conditions going into the amyl acetate phase. The amyl acetate layer was separated, and assayed 1518 units per ml. representing a 52% recovery and had total solids of 0.410 gram per 100 ml., that is, a purity of 370 units of penicillin activity per milligrams of solids. A similar portion of eluate from the same batch was treated in the same manner except for treatment with active carbon, and resulted in an amyl acetate extract assaying 1859 units per ml. and having a total solids content of .669 gram per ml., that is a purity of only 278 units of penicillin activity per milligram. Thus the active carbon treatment in this case resulted in an increase in purity of 33%.

EXAMPLE II

A filter mat measuring 1.06 inches thick was prepared on a Buchner funnel with 80 grams of active carbon (Darco G-60). One liter of aqueous acetone eluate solution assaying 188 Oxford units of penicillin activity per milliliter and having an acetone concentration of 67.1% acetone and adjusted to a pH of 8.1 was filtered through the above filter mat. The cake was washed with 240 ml. of 80% acetone and the wash was combined with the filtrate. The combined filtrate and wash were adjusted to pH 8.6-8.8 and evaporated in vacuo below 25° C. until substantially all the acetone had been removed. The evaporated eluate showed a penicillin recovery of 87% and assayed 188 units per ml. The evaporate was then chilled to 10° C., acidified to pH 2.5 and agitated for five minutes with 55 ml. of amyl acetate to transfer the penicillin activity to the amyl acetate. The amyl acetate layer was separated, the water layer reextracted, and the two amyl acetate extracts combined. The combined extracts assayed 1593 units of penicillin activity per ml. representing a 97% recovery of penicillin, and had a total solids of .296 gram per 100 ml., corresponding to a purity of 538 units of penicillin activity per milligram of solids. A similar portion of eluate from the same batch treated in the same manner except for the treatment with active carbon resulted in a combined amyl acetate extract assaying 1811 units per ml. and a total solids of .697 gram per 100 ml. corresponding to a purity of only 259 units per milligram. Thus the active carbon treatment under the above conditions resulted in an increase in purity of 108%.

EXAMPLE III

A filter mat 1 inch thick of active carbon was prepared on a Buchner funnel using 90 grams of active carbon of the lignite type (Darco G-60). Fifteen hundred ml. of an aqueous 70% isopropyl alcohol eluate solution, assaying 119 Oxford units of penicillin activity per ml. was adjusted to an apparent pH of 6.8 filtered through the active carbon filter mat and washed with 300 ml. of 70% aqueous isopropyl alcohol. The filtrate and washings were combined, resulting in a purified eluate of 1860 ml. assaying 62 units per ml. The purified eluate was adjusted to a pH of 7.9 with sodium hydroxide and evaporated in vacuo below 35° C. until substantially all of the isopropyl alcohol had been evaporated. The evaporated eluate showed a penicillin recovery of 72% and an assay of 3820 Oxford units per ml. To the evaporate, which consisted of 340 ml. of solution, was added approximately 1/6 of its volume (47 ml.) of amyl acetate. The solution was chilled to 10° C., acidified to a pH of 2.5 and stirred vigorously for five minutes. The amyl acetate layer containing the penicillin was separated, and assayed 2158 Oxford units of penicillin activity per ml. and had a total solids of 0.41 gram per 100 ml., corresponding to a purity of 526 Oxford units of penicillin activity per milligram of solids.

A similar portion of eluate from the same batch was treated in the same manner except that the treatment with active carbon was omitted. This resulted in an amyl acetate extract assaying 3359 units per ml. having a total solids content of 1.10 grams per 100 ml., that is, a purity of 306 units per milligram. Thus the active carbon treatment in this case resulted in an increase in purity of 71%.

The effect of varying the proportion of active carbon to penicillin-containing eluate solution is illustrated in Table I below in which aqueous-acetone eluates were filtered through varying proportions of active carbon ranging from 20 to 100 grams per liter of eluate solution.

*Table I*

EFFECT OF PROPORTION OF ACTIVE CARBON TO ELUATE ON PURITY OF PENICILLIN IN AMYL ACETATE

| Acetone in Eluate, Per cent by Vol. | Apparent pH of Eluate | Darco G-60 in g./l. of Eluate | Recovery of Penicillin in Eluate, Per cent | Purity of Penicillin in Amyl Acetate, Units/mg. | Percent Increase In Purity over Untreated |
|---|---|---|---|---|---|
| 67 | 8.1 | 0 | 100 | 259 | ------ |
|    |     | 20 | 93 | 338 | 30 |
|    |     | 40 | 86 | 374 | 44 |
|    |     | 60 | 84 | 407 | 57 |
|    |     | 80 | 87 | 538 | 108 |
| 55 | 6.8 | 0 | 78 | 519 | ------ |
|    |     | 20 | 82 | 709 | 37 |
|    |     | 40 | 89 | 714 | 38 |
|    |     | 60 | 87 | 843 | 62 |
|    |     | 100 | 79 | 793 | 51 |
| 70 | 7.35 | 0 | 100 | 278 | ------ |
|    |     | 20 | 97 | 325 | 17 |
|    |     | 40 | ------ | 367 | 32 |
|    |     | 60 | 94 | 370 | 33 |
|    |     | 100 | 96 | 485 | 74 |
| 66 | 7.6 | 0 | 100 | 417 | ------ |
|    |     | 20 | 93 | 433 | 4 |
|    |     | 40 | 100 | 508 | 21 |
|    |     | 60 | 100 | 481 | 15 |
|    |     | 100 | 100 | 508 | 21 |

The effect of the solvent to water ratio of the aqueous, water-miscible solvent solution is given in Table II below in the case of acetone water eluate, and shows that higher purity products are obtained from relatively low concentrations of solvent. However, as brought out above, at concentrations below about 50–60% solvent, the active carbon begins to adsorb penicillin as well as impurities, consequently purification will preferably be caried out on eluates having solvent, to water ratios above this point.

*Table II*

EFFECT OF ACETONE CONCENTRATION ON PURIFICATION OF PENICILLIN IN ELUATE BY ACTIVE CARBON

| Original Eluate pH | Acetone in Eluate before Filtration Per cent by Vol. | Purity of Penicillin in Amyl Acetate, Units/mg. |
|---|---|---|
| 6.9 | 55 | 580 |
|     | 65 | 458 |
|     | 80 | 437 |
|     | 92 | 400 |
| 8.5 | 45 | 430 |
|     | 56 | 409 |
|     | 65 | 384 |
|     | 75 | 388 |
|     | 86 | 366 |
| 6.9 | 50 | 546 |
|     | 60 | 468 |
|     | 70 | 540 |
|     | 80 | 514 |
| 6.9 | 55 | 758 |
|     | 64 | 720 |
|     | 75 | 647 |
|     | 85 | 635 |

Table III indicates effect of pH on the degree of purification effected by my active carbon treatment, showing that in general higher purities can be obtained by treating eluates at relatively low pH values within the range described. It will be observed that even at pH 5 some loss of penicillin activity occurs as evidenced by the relatively lower percentage penicillin recoveries at this figure. The optimum pH therefore appears to be as brought out above, the lowest apparent pH of the original eluate solution which will result in a pH of about pH 6, plus or minus 2 or 3 tenths, in a purified eluate; that is, an original pH of about 6.7 to 8.0.

*Table III*

EFFECT OF pH ON THE PURIFICATION OF THE ELUATE BY ACTIVE CARBON

| Acetone in Orig. Eluate, Per Cent by Vol. | Apparent pH of Original Eluate | Apparent pH of Purified Eluate | Penicillin Recovered in Purified Eluate Per Cent | Purity of Penicillin in Amyl Acetate, Units/mg. |
|---|---|---|---|---|
| 66 | 5.0 | 4.9 | 84 | 564 |
|    | 6.6 | 5.9 | 97 | 475 |
|    | 8.0 | 6.6 | 98 | 370 |
|    | 9.0 | 7.4 | 95 | 340 |
| 73 | 5.0 | 4.7 | 56 | 421 |
|    | 6.0 | 5.3 | 73 | 437 |
|    | 6.8 | 5.8 | 101 | 381 |
|    | 8.2 | 6.1 | 86 | 312 |
|    | 8.9 | 6.5 | 103 | 333 |

EXAMPLE IV

To a 100 ml. portion of an impure penicillin solution in amyl acetate assaying 378 Oxford units of penicillin activity per milligram of solids, and having an apparent pH of 2.5, was added 10 grams of active carbon (Darco G-60) and stirred for thirty minutes. The mixture was filtered and the active carbon filter cake was washed with 30 ml. of fresh amyl acetate. The resulting purified amyl acetate solution had a volume of 114 ml., and assayed 3215 Oxford units of penicillin activity. It had a total solids of 0.561 gram per ml., and a purity of 573 Oxford units per milligram of solids, corresponding to a purity increase over the untreated amyl acetate solution of 52%.

EXAMPLE V

To a 100 ml. portion of an amyl acetate solution of penicillin having a pH of 2.5, a total solids concentration of 1.32 g./100 ml., and a purity of 393 Oxford units of penicillin activity per milligram of solids was added 5 grams of active carbon (Darco G-60). The mixture was stirred for thirty minutes, then filtered and washed with 10 ml. of fresh amyl acetate. The resulting purified amyl acetate solution of penicillin had a volume of 100 ml., and assayed 4550 units of penicillin activity. It had a total solids concentration of 0.929 gram per 100 milliliters and a purity of 490 Oxford units per milligram, corresponding to a purity increase over the untreated solution of 25%.

A similar 100 ml. portion of the same amyl acetate solution of penicillin treated above was adjusted to a pH of 6.5 with a 1% solution of sodium hydroxide in methanol. To this solution was added 5 grams of active carbon and the mixture stirred thirty minutes, filtered, washed and assayed as before. The value of this solution was 112 ml., the assay 4170 Oxford units, the total solids concentration was 0.938 gram per 100 ml., and its purity 440 Oxford units of penicillin activity per milligram of solids. The purity increase in this case over that of the original solution was 13%.

EXAMPLE VI

Two portions of 100 ml. each of an amyl acetate solution of penicillin having a pH of 2.5 and a purity of 353 Oxford units of penicillin activity per ml. were treated with 5 grams and 10 grams respectively of active carbon, (Darco G-60), stirred for thirty minutes, filtered and washed with amyl acetate. The portion treated with 5 grams of carbon had a purity of 413 Oxford units per mg., a purity increase of 17% while the portion treated with 10 grams of carbon had a purity of 524 Oxford units per mg., a purity increase of 77%.

EXAMPLE VII

To show the suitability of various types of active carbon for the purification of organic solvent extracts of penicillin, 200 ml. portions of an amyl acetate solution of impure penicillin material having a pH of 2.5 and assaying 6320 Oxford units per ml. were each treated for 15 minutes with 10 grams of the active carbon indicated in the table. The carbon was filtered off and washed with 50 ml. of fresh amyl acetate. The combined filtrates and washings were titrated to a pH of 6.7 with an aqueous solution of sodium hydroxide, stirred for 30 minutes and the layers separated. The aqueous layer, now containing the penicillin was assayed and analyzed for total solids with the results given in the table below.

*Table IV*

| Carbon Used | Assay of Treated Amyl ac. solu. | Assay of Aqueous Extract | Total solids, g./100 ml. | Purity units per mg. | Purity Increase, per cent |
|---|---|---|---|---|---|
| None | 6,320 | 18,600 | 3.31 | 560 | |
| Darco G-60 | 5,490 | 24,300 | 3.36 | 720 | 29 |
| Norit AX | 4,800 | 25,500 | 3.37 | 760 | 36 |
| Nuchar C-190-N | 4,450 | 22,900 | 3.35 | 680 | 21 |

While the above describes the preferred embodiments of my invention, it is understood that departures may be made therefrom within the scope of the specification and claims.

What is claimed is:

1. In the purification of solutions in organic solvents of penicillin from which impurities have already been partly removed by the steps of adsorbing the penicillin on active carbon from an aqueous solution followed by eluting the penicillin with an aqueous-organic solvent, the process which comprises contacting the resulting partly purified penicillin with additional active carbon of the decolorizing type while in solution in a water-miscible organic solvent containing less than 40 per cent of water and having an apparent pH of less than 8, to adsorb impurities from the solution, and then recovering the unadsorbed penicillin from the solution.

2. The process of purifying penicillin which comprises adsorbing penicillin from an aqueous liquor containing the same by contacting the liquor with active carbon of the decolorizing type to adsorb the penicillin, removing the impurities not adsorbed on the carbon, eluting the penicillin from the carbon, then contacting the penicillin while dissolved in a water-miscible organic solvent containing less than 40% of water with additional active carbon of the decolorizing type to adsorb remaining impurities without adsorbing the penicillin, removing the carbon together with the impurities adsorbed therein, and recovering the penicillin from the remaining solution.

ROBERT F. TAYLOR.

REFERENCES CITED

The following references are of record in the file of this patent:

UNITED STATES PATENTS

| Number | Name | Date |
|---|---|---|
| 2,399,840 | Wachtel | May 7, 1946 |
| 2,461,949 | Wintersteiner et al. | Feb. 15, 1949 |

OTHER REFERENCES

Penicillin Technical Meeting; Hotel Astor, New York; Jan. 21–22, 1940; Summary of the Discussions.

Lancet II; August 16, 1941, pp. 177–189.

Abraham, British J. of Exp. Pathology; June 1942, pp. 104–105, 108.

Restricted Report 13; June 26, 1943.

Restricted Report 14; Sept. 6, 1943.

Restricted Report 15; Sept. 6, 1943.

"Studies on the Adsorption of Penicillin on Various Activated Carbons and its Elution with Amyl Acetate-Water Mixtures and 80%" by Whitemore, Penn State College; Jan. 21–22, 1944.

Pfizer Report, Edition January 2, 1944, pp. 19–22, Introduction pp. 1 and 2 (Recovery of Penicillin) pp. 2, 14.

Penicillin Interim Report, 44–1; March 6, 1944.

Committee on Medical Research of the Office of Scientific Development by R. D. Coghill.

Office of Production Research and Development; W. P. B. Contract 126 Penn. State College.